No. 626,325. Patented June 6, 1899.
J. B. HOPPER.
SHIPPING CASE.
(Application filed Dec. 21, 1897.)
(No Model.)
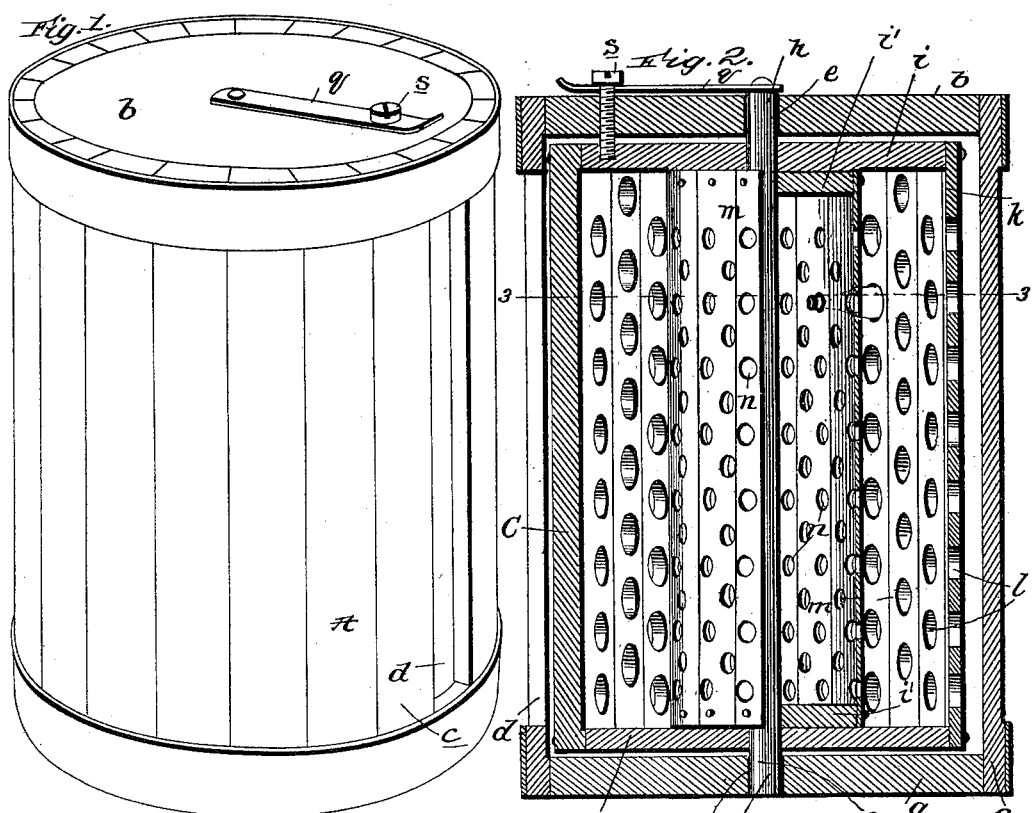
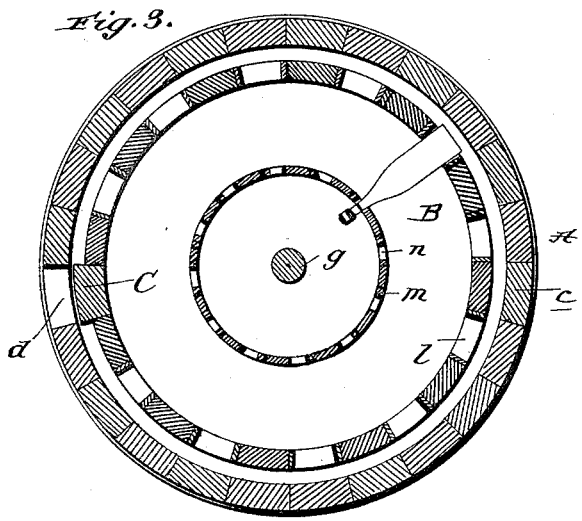
Witnesses:
Inventor
J. B. Hopper
By Jas. J. Sheehy
Attorney
THE NORRIS PETERS CO., PHOTO-LITHO., WASHINGTON, D. C.

UNITED STATES PATENT OFFICE.

JAMES B. HOPPER, OF LAWSON, MISSOURI.

SHIPPING-CASE.

SPECIFICATION forming part of Letters Patent No. 626,325, dated June 6, 1899.

Application filed December 21, 1897. Serial No. 662,964. (No model.)

*To all whom it may concern:*

Be it known that I, JAMES B. HOPPER, a citizen of the United States, residing at Lawson, in the county of Ray and State of Missouri, have invented new and useful Improvements in Shipping-Cases, of which the following is a specification.

My invention relates to shipping-cases, and contemplates the provision of a case designed more particularly for shipping bottles and the like, the said case being constructed with a view of preventing breakage of the bottles and permitting of the ready introduction and removal of the same by authorized persons, as will be hereinafter described, and particularly pointed out in the claims appended.

In the accompanying drawings, Figure 1 is a perspective view of my improved case, the same being shown as locked. Fig. 2 is a vertical diametrical section. Fig. 3 is a transverse section taken in the plane indicated by line 3 3 of Fig. 2.

In the said drawings similar letters designate corresponding parts in all of the several views, referring to which—

A is the exterior casing of my improved packing-case. This casing A is by preference cylindrical in form and made up of lower and upper heads $a\ b$ and staves $c$, suitably connected to the same. It is provided in one side with an opening $d$, preferably formed by cutting away one of the staves $c$, and is also provided in its heads $a\ b$ with central apertures $e$.

B is a rotary bottle-rack arranged within the casing A. In the preferred embodiment of the invention this rack B comprises a central shaft $g$, terminating at its ends in trunnions $h$, journaled in the apertures $e$ of the casing-heads; heads $i\ i'$, fixedly connected to said shaft; an outer circular wall $k$, of wood or other suitable material, connected to the peripheries of the heads $i$ and having openings $l$ for the reception of the bodies of bottles, and an inner circular wall $m$, of wood or other suitable material, connected to the heads $i'$ and having openings $n$, designed to receive the necks of bottles after the manner shown in Figs. 2 and 3.

The trunnions $h$ of the rotary rack B bear in the apertures $e$ in the heads $a\ b$ and permit of the said rack being easily turned through the medium of a handle $q$, connected to the upper end of its upper trunnion, as shown. In this way each vertical series of openings $l\ n$ in the outer and inner walls of the rack B may in succession be brought coincident with the opening $d$ in the casing-wall, so as to permit of bottles being quickly and conveniently placed in and removed from such openings.

In order to prevent the removal of bottles from the rack B and case A by unauthorized persons, I provide the outer wall $k$ of the rack with an imperforate strip C, which projects slightly from the wall, as shown. This strip C is designed, when arranged opposite the opening $d$ in casing A, to effectually prevent access being gained to the interior of the casing through said opening. The strip C is secured in a position opposite the opening $d$ by locking the rack B against rotation. This may be done in any suitable manner, but I prefer to effect it through the medium of the screw $s$, which takes through the upper head $b$ of the casing A and into the upper head of the rack B, as illustrated.

When it is desired to remove bottles from the case, it is simply necessary to remove the screw $s$ and rotate the rack B to bring the vertical series of bottles opposite the opening $d$ in casing A in succession. As each series is brought opposite said opening $d$ they are removed through the same, and the next series is then brought into position for removal. The same course is followed in placing the bottles in the rack and case.

It will be appreciated from the foregoing description that my improved case is capable of containing a large number of bottles and holding the same in such a manner as to greatly lessen the liability of them being broken. It will also be appreciated that the bottles may be quickly and easily placed in and removed from the case and that when desired removal of the bottles by any but an authorized person may be effectually prevented.

When desirable, it is obvious that my improved shipping-case may be used to advantage for shipping frangible ware other than bottles.

Having thus described my invention, what I claim is—

1. A shipping-case comprising an exterior casing having an opening, a rotary rack arranged in the casing and having inner and outer portions adapted to hold the necks and bodies, respectively, of bottles, and also having a strip projecting beyond its outer portion and adapted when arranged opposite the opening in the casing to close the same, substantially as specified.

2. A shipping-case comprising an exterior casing having an opening in its side and also having central openings in its heads or ends, a rotary rack arranged in the casing and having trunnions journaled in the heads or ends thereof and also having inner and outer portions adapted to hold the necks and bodies, respectively, of bottles, and further having a strip projecting beyond its outer portion and adapted when arranged opposite the opening in the casing to close the same, a handle arranged outside the casing and connected to one of the trunnions of the rotary rack, and suitable means for securing said handle to one head or end of the casing, substantially as specified.

3. The shipping-case having the cylindrical casing having the opening $d$ in its side and central openings in its ends, in combination with the rotary rack arranged in said casing and comprising the central shaft having its ends terminating in trunnions journaled in the apertures of the casing-heads, heads $i$, $i'$ fixed on said shaft, an inner circular wall connected to the heads $i'$ and having openings, an outer circular wall connected to the heads and having openings, and a strip connected to and projecting from the outer wall, a handle arranged outside the casing and fixed to one trunnion of the rotary rack, and means for fixing said handle against movement, substantially as specified.

In testimony whereof I have hereunto set my hand in presence of two subscribing witnesses.

JAMES B. HOPPER.

Witnesses:
RALPH M. McGEE.
T. J. MEADOWS.